United States Patent
Cotta, Sr. et al.

(10) Patent No.: US 9,096,172 B2
(45) Date of Patent: Aug. 4, 2015

(54) LIGHTING SYSTEM FOR PIVOTALLY MOUNTING AN ELONGATED LIGHT BAR TO A SUPPORT STRUCTURE

(76) Inventors: Russell R. Cotta, Sr., Madera, CA (US);
Russell R. Cotta, Jr., Fresno, CA (US);
Dana D. Cotta, Madera, CA (US)

( * ) Notice: Subject to any disclaimer, the term of this patent is extended or adjusted under 35 U.S.C. 154(b) by 455 days.

(21) Appl. No.: 13/490,410

(22) Filed: Jun. 6, 2012

(65) Prior Publication Data
US 2013/0329413 A1 Dec. 12, 2013

(51) Int. Cl.
*F21V 21/14* (2006.01)
*B60Q 1/18* (2006.01)
*B60Q 1/04* (2006.01)

(52) U.S. Cl.
CPC ............... *B60Q 1/18* (2013.01); *B60Q 1/0483* (2013.01)

(58) Field of Classification Search
CPC ... F21Y 2103/00; F21V 19/008; F21V 21/30; F21V 19/02; F21S 8/06
USPC ............ 362/220, 232, 371, 430, 419, 217.12, 362/327
See application file for complete search history.

(56) References Cited

U.S. PATENT DOCUMENTS

| | | | |
|---|---|---|---|
| 7,950,821 B1 | 5/2011 | Georgitsis et al. | |
| 2006/0187670 A1* | 8/2006 | Dalton et al. | 362/503 |
| 2009/0290335 A1* | 11/2009 | Levine | 362/220 |
| 2012/0113666 A1* | 5/2012 | Slipp | 362/523 |

* cited by examiner

*Primary Examiner* — Joseph L Williams
(74) *Attorney, Agent, or Firm* — Richard A. Ryan

(57) ABSTRACT

A lighting system configured to mount an elongated light bar to a mountable surface of a support structure, such as a roll bar, roll cage or other component of a motor vehicle. The light bar has a linear light module disposed in a housing that is configured to produce light therefrom. The lighting system has a first mounting assembly pivotally attached to the first end of the light bar and a second mounting assembly pivotally attached to the second end of the light bar. Each mounting assembly has a mounting member connected to a mechanism that removably attaches to the mountable surface. The mounting mechanism may be configured to clamp to a tubular or other shaped surface or abut against a planar surface. In one configuration, the mounting mechanism fully encircles the mountable surface. The lighting system may also include a mechanism for limiting pivotal movement of the light bar.

20 Claims, 8 Drawing Sheets

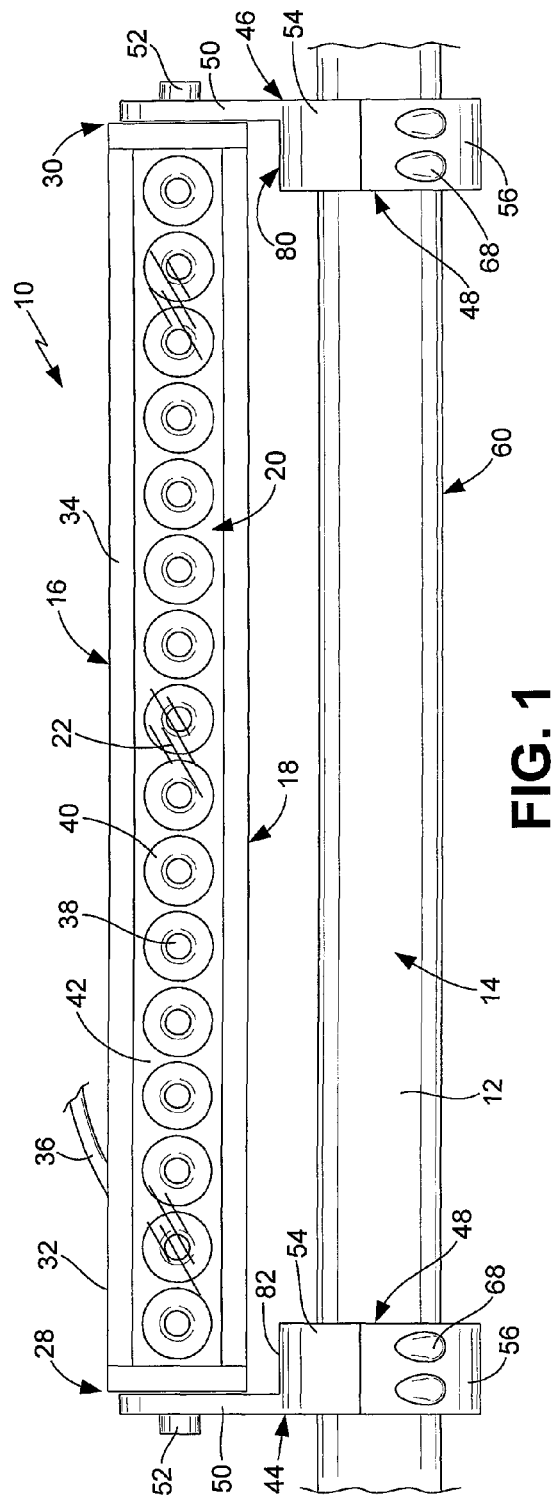
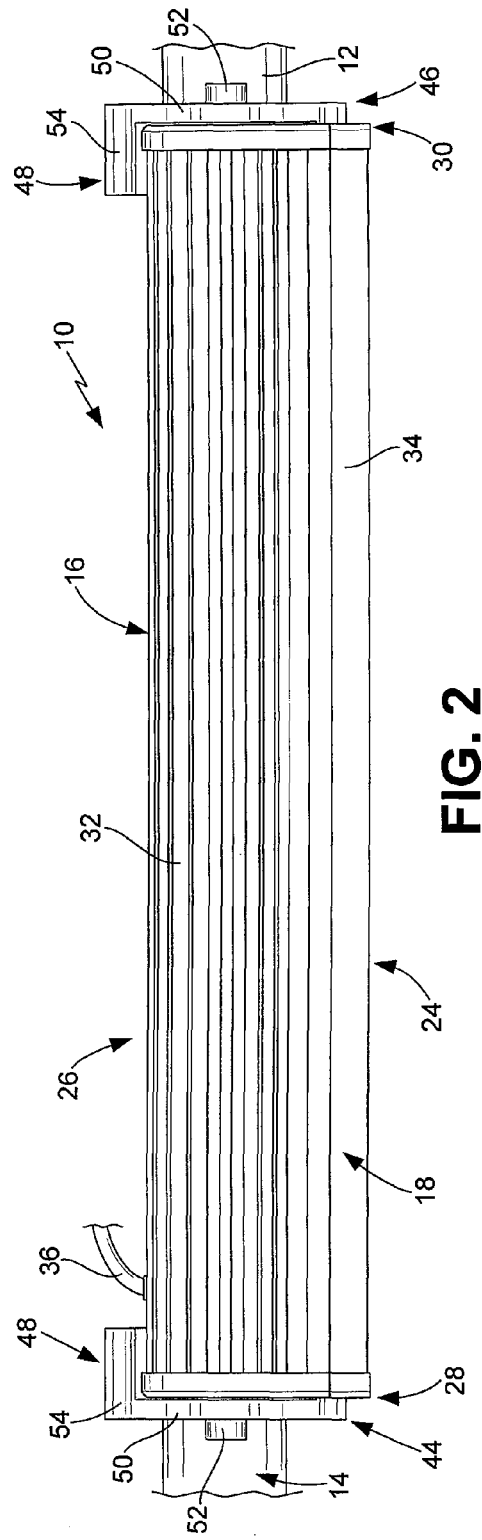

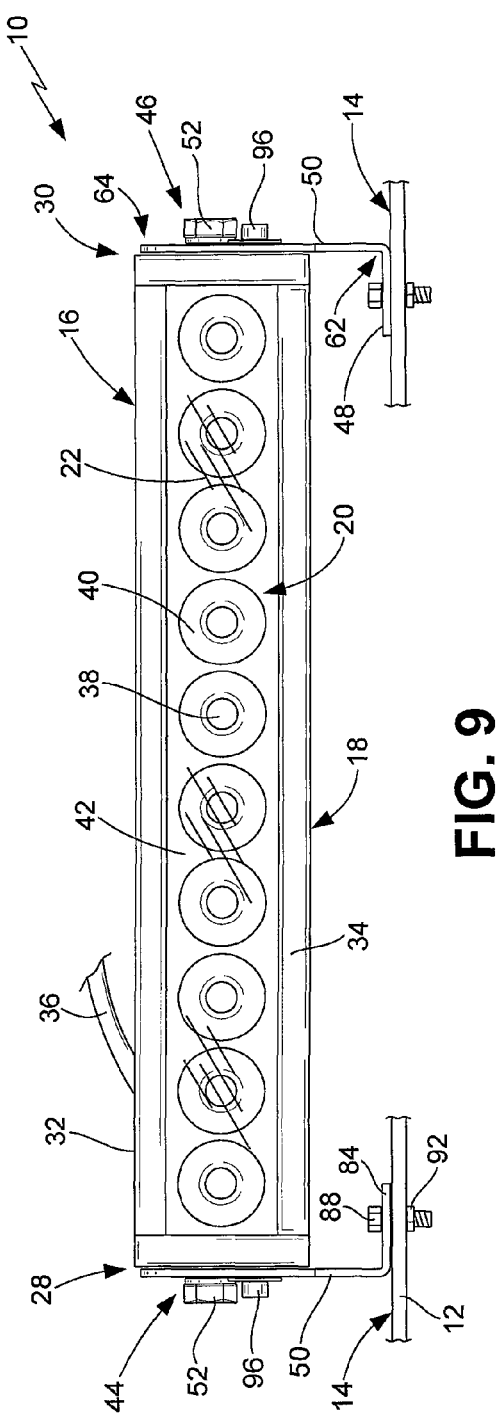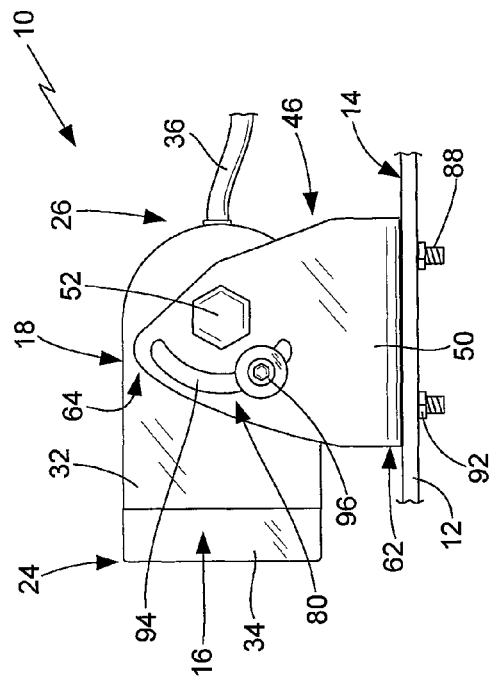

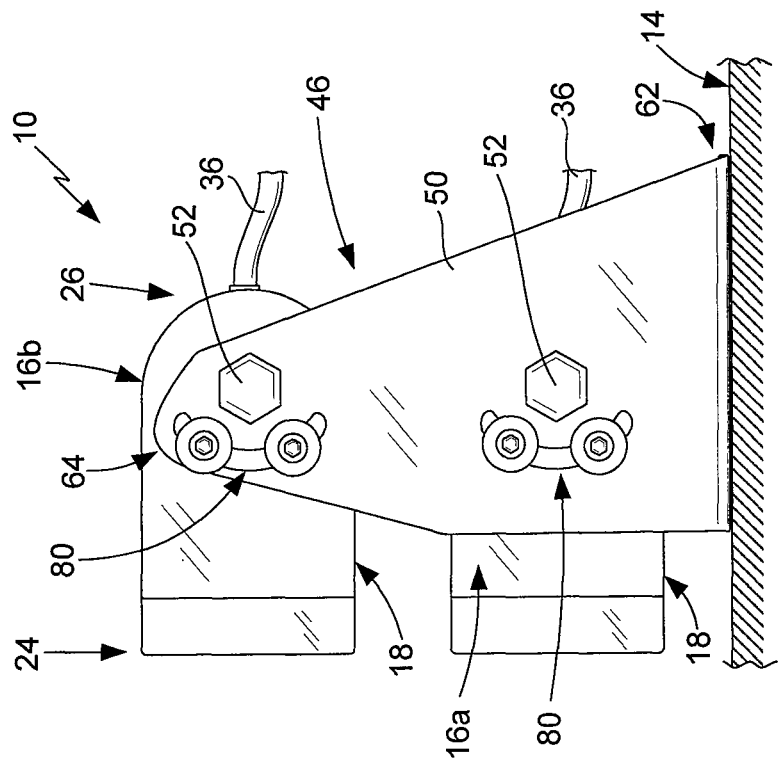
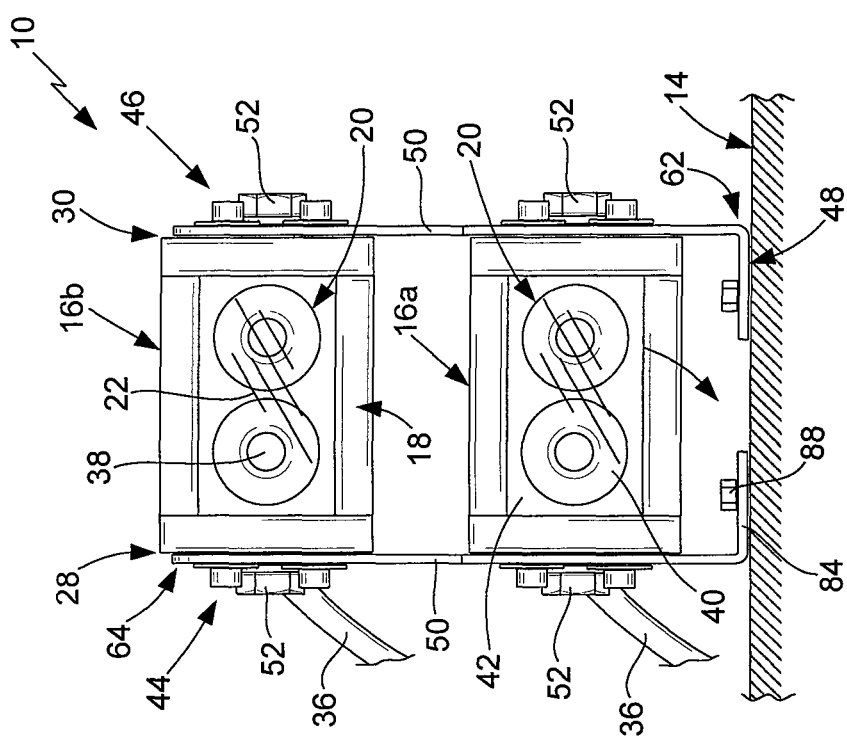

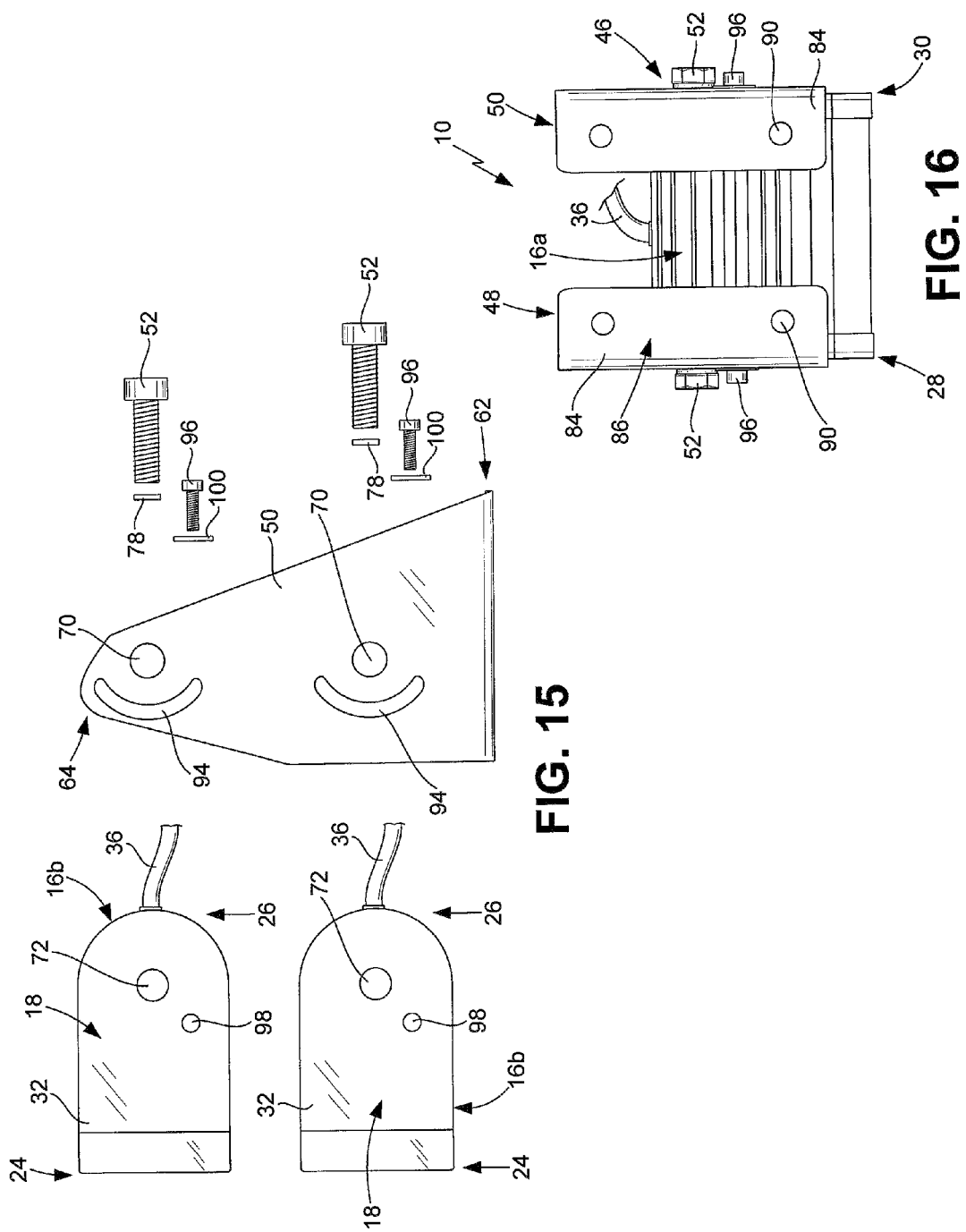

LIGHTING SYSTEM FOR PIVOTALLY MOUNTING AN ELONGATED LIGHT BAR TO A SUPPORT STRUCTURE

BACKGROUND OF THE INVENTION

A. Field of the Invention

The field of the present invention relates generally to systems for removably securing a light apparatus to a mountable surface. In particular, the present invention relates to such lighting systems that are configured to mount an elongated light bar to a mountable surface, including tubular and planar surfaces. Even more particularly, this invention relates to such lighting systems that are beneficially utilized to mount an elongated light bar to a tubular or planar surface of a motor vehicle or the like.

B. Background

Use of auxiliary lighting systems that mount to a surface to illuminate an area generally near the surface are well known in the prior art. In addition, it is also well known to configure such an auxiliary lighting system so the system can be removably mounted to the surface. With regard to auxiliary lighting systems that are utilized on a motor vehicle to illuminate an area forward of, along the side of or rearward of the vehicle, the use of such lighting systems are also well known in the art. In particular, it is well known to removably mount a lighting system on a motor vehicle, whether directly or indirectly being attached to the vehicle, in order to provide light that can assist with the movement of the vehicle, activity at or near the vehicle and/or otherwise assist with the safe operation of the vehicle. For instance, the safe operation of many off-road vehicles benefit from the placement of one or more auxiliary lighting systems on one or more surfaces of the vehicle to illuminate the area in front of the vehicle so it may stay on the road, trail or other path on which it is traversing. In one such use, the lighting system is mounted directly to the body of the vehicle. In another configuration, which is perhaps the more common configuration, the lighting system is mounted to a roll bar, cage or other structure support attached to or integral with the vehicle.

In addition to being adaptable for removably mounting to a vehicle or components thereof, lighting systems utilized with a motor vehicle and the like must be configured to be powered by the vehicle's electrical system. As can be readily appreciated by those skilled in the art, the higher the level of illumination produced by a particular type or configuration of the lighting system, the greater amount of electricity that is required to power the lamp or other light-producing components thereof that actually provide the light. Naturally, it is beneficial to use light-producing components which produce the most amount of light for the least amount of electricity. Likewise, it is also beneficial to provide a lighting system that is relatively compact so as to not extend above or away from the vehicle's mount surface any more than is necessary to accomplish the objectives of the lighting system. As generally known by those skilled in the art, lighting systems that generate substantial amount of light while requiring a relatively low amount of power and being substantially compact are those that utilize light-emitting diodes (LEDs). In addition to their energy use efficiency and ability to produce relatively bright light, LEDs are also well know for the very low level of heat generation when compared to other types of light-producing lamps.

One well known configuration for use of LEDs and the like is to place a plurality of LEDs together in one housing in a manner such that the LEDs are powered and controlled as a unit, although not all of the LEDs may be powered on at the same time depending on the amount of light desired to be produced by the unit. One such configuration is commonly referred to as an elongated light bar. As well known in the art, a typical elongated light bar has a plurality of LEDs arranged in one or more rows facing in one or more directions and disposed in a housing that is structured and arranged to house the LEDs. The most common configuration for such light bars is to utilize a linear light module having a plurality of LEDs, enclose the linear light module inside the housing and position the LEDs along one or more linear rows with the LEDs facing the same way such that the light produced therefrom is directed out one side, typically the front side, of the housing. The LEDs on the linear light module are usually positioned behind a transparent front wall or surface that allows the light from the LEDs to leave the light bar housing and illuminate the area desired to be lighted thereby. As known to those skilled in the art and generally available for purchase, the typical linear light module comprises the electrically-driven LEDs, a focusing lens associated with each LED to focus the light generated by the LED into a beam of a desired pattern, a lens positioner associated with each focusing lens to position the lens relative to the LED and a composite circuit board having appropriately configured interface circuiting printed thereon that is adapted to supply the electrical power from the power supply to the LEDs and selectively control the operation of those LEDs. Typically, the LEDs, focusing lenses and lens positioners are mounted directly onto the composite circuit board in a manner that provides the desired light operation and the necessary heat dissipation for efficient use of the linear light module. An example of the prior art configuration and use of a linear light module having a plurality of LEDs is set forth in U.S. Pat. No. 7,950,821 to Georgitsis, et al., the Specification of which (including the written disclosure and drawings thereof) are hereby incorporated into the present disclosure as though fully set forth herein. As also set forth in the patent to Georgitisis (hereinafter the "'821 patent"), the linear light module is generally mounted inside the housing in a manner which directs the light from the LEDs out of the housing in the direction desired by the configuration of the light bar.

Although there are numerous mounting surfaces available in, on or otherwise associated with a motor vehicle, such as the surface of the body of the vehicle and various interior surfaces, most auxiliary lighting systems are mounted to the surface of a bar, cage, bumper, frame, panel or other external component that is attached to or, in some circumstances, integral with the vehicle. Typically, these components extend outwardly from the vehicle, often in a manner so it will protect the vehicle or occupant thereof in case of an accident, which may be a collision with another vehicle, ground or object (such as large rocks and the like during off-road use of the vehicle). As well known to those skilled in the art, the mountable surface of the vehicle or its attached external components may be in any of a wide variety of different configurations, including having a generally round, square, rectangular or other cross-sections or being shaped with a generally planar mounting surface. Such mounting surfaces are particularly common for mounting the elongated light bars described above for vehicle auxiliary lighting. In one well known use of such auxiliary lighting systems, the elongated light bar is mounted to the surface of a tubular roll bar, which often has a round cross-section but may have square, rectangular or other cross-sections, or to the planar surface of a roll cage, platform or like apparatus.

When mounting an elongated light bar to a mountable surface of a motor vehicle or one of its auxiliary components, it is imperative that the mounting system be configured to secure the elongated light bar to the mountable surface in a manner that will not result in undesirable separation from the surface while the vehicle is in use. This is particularly a concern for those motor vehicles, such as cars, trucks, SUVs, jeeps, ATVs, sand rails, dune buggies and the like, that are utilized for off-road travel. As can be readily appreciated by those skilled in the art, such use of the motor vehicle is likely to impart substantial stress to the mounting system utilized to mount the elongated light bar to the vehicle. Failure to properly design, engineer and manufacture the mounting system is likely to result in the light bar separating from the mountable surface, which may destroy the light bar. In addition to safely attaching the elongated light bar to the vehicle, the mounting system must be configured to provide stability for the light bar. As can be appreciated by those who utilize such light bars, particularly for off-road uses, failure to mount the light bar with sufficient stability is likely to result in the light being discharged therefrom being directed to places where it is not useful or of little use. For instance, the lack of stability may cause the light from a forward facing light bar being directed onto the front of the vehicle, too far ahead of the vehicle or too high into the sky, all of which would be of no practical use for the person operating the vehicle who desires the road or other path ahead of him or her to be lighted for safe movement of the vehicle. As also well known, most users of elongated light bars prefer that the light bar be removably attached to the vehicle so that he or she may replace the light bar as necessary or desired to repair, replace or upgrade the light bar.

A variety of mounting systems are presently available to removably mount an elongated light bar to a motor vehicle, including but not limited to the roll bar, roll cage or other external components thereof. The '821 patent set forth above describes a mounting system that comprises an elongated support bar, which is received in a bar-receiving channel of the central housing section of the outer housing assembly, a pair of attachment legs that are configured to engage the outer surface of the support structure (i.e., a tubular member) and a fastener that is received through a pair of opposing apertures in the support structure so as to interconnect the elongated support bar and support structure. The fastener can be a bolt having a threaded portion which removably receives a nut thereon in a manner that, when threadably engaged thereto, clamps the attachment legs to the side of the support structure opposite where the nut is received onto the fastener. The position of each attachment leg is associated with an elongated slotted hole in the support bar, through which the fastener is received, that allows the user to linearly position, within the limits defined by the size of the slotted hole in the support bar, the light bar assembly relative to the tubular support structure. Although the mounting assembly of the '821 patent appears to securely and with sufficient stability mount the light bar assembly to the support structure, it is relatively expensive to manufacture, somewhat limits the position of the light bar on the support structure (due to the fastener having to be received through the aperture in the support structure) and the stability of the lighting system is only provided by the limited engagement of the attachment legs to a relatively small portion of the outer surface of the support structure.

Despite the availability of the prior art mounting systems, what is needed is an improved lighting system for use to removably mount an elongated light bar onto the mountable surface of a vehicle or an external component of the vehicle, such as a roll bar, cage, platform or the like attached to or integral with the vehicle. Such a system should be configured to securely mount the light bar to the mountable surface in a manner that will not result in the light bar separating from the surface during use of the vehicle, including during off-road operation of the vehicle. The system should also be configured to provide sufficient stability for the light bar such that the light produced therefrom will be directed where it is intended so as to provide the desired benefit to the operator and/or other persons in the vehicle. Preferably, the lighting system should be configured so as to be adaptable to engaging the mounting surface of a wide variety of different sizes and configurations of mounting structures, such as surfaces having a round, square, rectangular or other cross-section and to planar surfaces. With regard to use with elongated support structures, such as tubular members and the like, the improved lighting system should be configured to provide for a wide range of linear placement of the light bar on the support structure and be configured so as to allow the user to relatively easily move the lighting system anywhere along the length of the support structure. Preferably, the improved lighting system provides the benefits described above in a more economical configuration than is currently available with regard to prior art lighting systems.

SUMMARY OF THE INVENTION

The new lighting system for elongated light bars of the present invention provides the benefits and solves the problems identified above. That is to say, the present invention discloses a lighting system which securely mounts an elongated light bar to a mountable surface of a support structure, such as a roll bar, cage, platform or the like that is attached to, integral with or otherwise associated with a motor vehicle. In particular, the lighting system of the present invention mounts the elongated light bar to the mountable surface in a manner such that the light bar will not separate from the support structure during use of the vehicle to which it is attached, even during rigorous off-road or other use of the vehicle. The lighting system of the present invention mounts the elongated light bar to the support structure in a manner that provides sufficient stability such that the light produced by the light bar will be directed toward where the user of the lighting system intends and remain so directed during use of the vehicle. The lighting system of the present invention is adaptable for secure, stable attachment to a wide variety of different shapes and configurations of support structures, including elongated support structures, such as tubes and the like having a round, square, rectangular or other cross-section, and to planar surfaces, such as found on a mounting platform or on top of a roll cage or the like. When utilized with elongated support structures such as tubes and the like, the lighting system of the present invention does not require apertures be drilled into the support structure and, as such, allows the user to easily and relatively quickly position the elongated light bar along the length of the support structure. Because the lighting system of the present invention does not require the use of internal support bars in the housing of the light bar, it is generally less expensive to manufacture.

In one embodiment of the present invention, the lighting system generally comprises an elongated light bar, a first mounting assembly at a first end of the light bar and a second mounting assembly at a second end of the light bar. The elongated light bar has a housing that is structured and arranged to house, typically by fully enclosing, at least one linear light module to discharge light from the light module through a transparent surface of the housing. The light module is configured to produce the light. The transparent surface of the housing is disposed generally between the first end and the second end of the light bar along one side, typically the front or forward facing side, of the light bar. The first mounting assembly is pivotally attached to the first end of the light bar and the second mounting assembly is pivotally attached to the second end of the light bar. Each of the first and second mounting assemblies have a mounting means for removably mounting the light bar to a mountable surface of a support structure and a mounting member interconnecting the mounting means and the light bar. The mounting member of each mounting means has a first end that is positioned adjacent the housing of the light bar and a second end that is attached to or, preferably, integral with the mounting means. Preferably, the first end of the mounting member of the first mounting assembly is in abutting relation with the first end of the light bar and the first end of the mounting member of the second mounting assembly is in abutting relation with the second end of the light bar. In a the preferred configuration, the mounting member of the first mounting assembly and the mounting member of the second mounting assembly are both structured and arranged to dispose the light bar in spaced apart, but relatively close, relation to the mountable surface.

Preferably, the lighting system also includes a pivot limiting means associated with at least one of the first mounting assembly and the second mounting assembly for limiting the pivotal movement of the light bar relative to the support structure. In one embodiment, the pivot limiting means comprises an inwardly disposed ledge structure attached to or integral with the mounting member of the first mounting assembly and an inwardly disposed ledge structure attached to or integral with the mounting member of the second mounting assembly, with each of the ledge structures being sized and configured to abut the housing of the light bar when limiting the pivotal movement of the light bar. In another embodiment, the limiting means is a slot in the mounting members of each of the mounting assemblies and a pivot limiter, which may be a bolt or like object, at each end of the light bar, with the slots being sized and configured to receive the respective pivot limiter and to abut the pivot limiter when limiting the pivotal movement of the light bar.

In the preferred embodiment of the present invention, the mounting means of each of the first mounting assembly and the second mounting assembly are configured so as to removably secure the light bar to the mountable surface. In one embodiment the mounting means of each of the first mounting assembly and the second mounting assembly comprises an upper/first engaging member, a lower/second engaging member and one or more connecting elements that are selected to connect the two engaging members together and attach them onto the mountable surface of the support structure. Preferably, the first engaging member and the second engaging member are cooperatively configured to clamp each of the first mounting assembly and the second mounting assembly onto the mountable surface. The first and second engaging members can jointly define a support aperture that is correspondingly sized and configured with the structure shape of the mountable surface so as to abuttingly engage the mountable surface by at least substantially fully encircling the surface so as to provide a complete 360 degree clamping engagement therewith. In another embodiment, wherein the mountable surface is at least substantially planar, the mounting means of the two mounting assemblies has an attaching member with an attaching surface that is cooperatively configured with the mountable surface so the attaching member may be placed in abutting relationship with the mountable surface. The mounting means of this configuration also has one or more connecting elements that are selected to removably attach the attaching member to the mountable surface of the support structure.

Accordingly, one of the primary aspects of the present invention is to provide a new lighting system for elongated light bars that has the advantages discussed above and which overcomes the disadvantages and limitations that are associated with presently available lighting systems for elongated light bars.

It is an important aspect of the present invention to provide a new lighting system that is configured to securely attach an elongated light bar to a mountable surface of a support structure, which may be attached to, integral with or otherwise associated with a motor vehicle.

It is also an important aspect of the present invention to provide a lighting system that is adaptable for use to securely mount an elongated light bar onto the mountable surface of a wide variety of different sizes and configurations of support structures, including structures having a mounting surface comprising a round, square, rectangular or other shaped cross-sections and to structures having a planar mounting surface.

It is also an important aspect of the present invention to provide a lighting system that securely mounts an elongated light bar to a support structure of a motor vehicle in a manner that provides sufficient stability for the light bar such that the light produced therefrom remains directed to an area where the user thereof needs or desires the area to be illuminated, even during relatively rigorous off-road use of the vehicle.

It is also an important aspect of the present invention to provide a lighting system for elongated light bars that allows the light bar to be easily and selectively positioned along the length of a mountable surface of an elongated support structure, such as a tubular member or the like, so as to provide the user of the lighting system with a relatively wide range of linear placement of the light bar on the support structure.

It is also an important aspect of the present invention to provide a lighting system for elongated light bars that provides the desired benefits set forth above in a configuration which is relatively economical to manufacture and easy to install and use with a support structure attached to, integral with or otherwise associated with a motor vehicle.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 1 is a front view of a lighting system for elongated light bars configured according to a first embodiment of the present invention shown mounted to a cylindrically-shaped tube;

FIG. 2 is a top plan view of the lighting system of FIG. 1 shown mounted to the cylindrically-shaped tube of FIG. 1;

FIG. 9 is a front view of a lighting system for elongated light bars configured according to a second embodiment of the present invention shown mounted to a generally planar surface;

FIG. 10 is an end view of the second end of the lighting system of FIG. 9 shown mounted to the generally planar surface;

FIG. 13 is a front view of a lighting system for elongated light bars configured according to a third embodiment of the present invention shown mounted to a generally planar surface;

FIG. 14 is an end view of the second end of the lighting system of FIG. 13 shown mounted to the generally planar surface;

FIG. 15 is an exploded view of the second end of the lighting system of FIG. 13 showing the second mounting assembly separated from the second end of the elongated light bar; and FIG. 16 is a bottom plan view of the lighting system of FIG. 13 shown without the connectors used to removably connect the mounting assemblies to the generally planar surface.

DETAILED DESCRIPTION OF THE PREFERRED EMBODIMENTS

Figure 4:
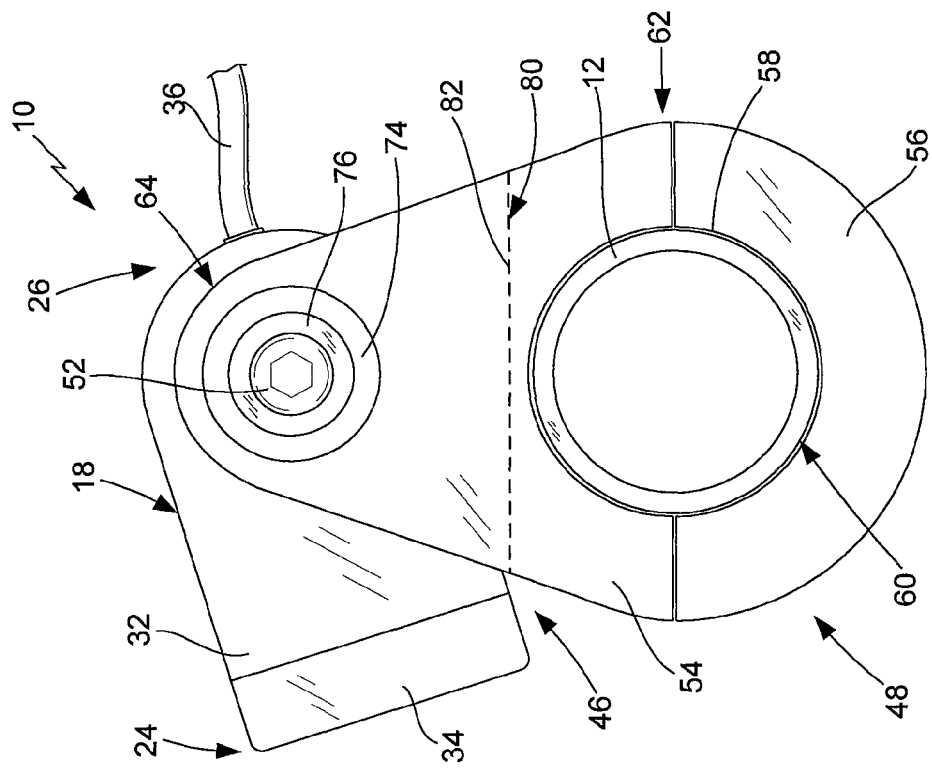
FIG. 4 is an end view of the second end of the lighting system of FIG. 3 shown with the front side of the elongated light bar pivoted generally downward.

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein set forth certain examples of the components and use of the lighting system of the present invention, those skilled in the art will readily understand that these examples are being provided for the purpose of explaining the present disclosure and that the present invention is not so limited.

A lighting system that is configured according to one or more of the preferred embodiments of the present invention is shown generally as 10 in FIGS. 1-5, 9-10, 12-14 and 15. The lighting system 10 of the present invention is beneficially configured for use with and attachment to a support structure 12 having a mountable surface 14 associated therewith. As set forth in more detail below, the lighting system 10 is removably attached to the support structure 12 so that an elongated light bar 16 of the lighting system 10 may produce light and direct the light toward an area that is desired by the user thereof to be lighted. In one use of the lighting system 10, the support structure 12 is attached to, integral with or otherwise associated with a motor vehicle (not shown) such that the light produced by light bar 16 may be directed to the road, path or other area which the user needs or desires to be lighted so as to safely and efficiently traverse the area. In one embodiment, the motor vehicle is an off-road vehicle, such as a car, truck, SUV, ATV, sand rail, dune buggy or the like. However, the lighting system 10 of the present invention is not so limited. As will be readily appreciated by those skilled in the art, the lighting system 10 of the present invention can be utilized with a wide variety of different motor vehicles, including motor vehicles which are driven on roads, streets, highways and the like and vehicles which are used in the air or on water. Likewise, lighting system 10 of the present invention can also be used with non-motorized vehicles, including those used on land or in the air or water. The lighting system 10 is adaptable to all such uses The potential support structures 12 to which the lighting system 10 may be attached can have a wide variety of different configurations and be of a variety of different sizes. In one likely common use of the lighting system 10 of the present invention, the elongated light bar 16 will provide light for an off-road vehicle as it traverses a somewhat varied, non-planar terrain. In such use, the support structure 12 is likely to comprise at least one upper transversely disposed component of a roll bar, cage or the like that is configured to protect the people inside the passenger compartment of the vehicle. This component is likely to have a round, square, rectangular or other shaped cross-section and, in many configurations due to weight considerations, be a tubular member. In other lighting uses, support structure 12 may comprise a generally planar surface to which the elongated light bar 16 is attached. In the embodiment of FIGS. 1 through 8, lighting system 10 is configured for use with a support structure 12 having a round or generally round cross-section that defines a round or substantially round mountable surface 14. In the embodiment of FIGS. 9 through 16, lighting system 10 is configured for use with a support structure 12 that defines a planar or at least substantially planar mountable surface 14. As will be readily appreciated by those skilled in the art, the lighting system 10 of the present invention is adaptable to all such uses and, as such, lighting system 10 is not limited by the scope of the example uses and configurations of the support structure 12 set forth in detail herein.

In the embodiment of FIGS. 1 through 8, the support structure 12 is a cylindrical tubular member having a round or generally round cross-section which defines a round or substantially round mountable surface 14 and lighting system 10 is configured to securely mount the elongated light bar 16 to support structure 12 in a manner that disposes the light bar 16 in spaced apart relation above the support structure 12. In one embodiment, the lighting system 10 is configured to limit the spacing of the elongated light bar 16 above the support structure 12 to reduce the amount of impact the light bar 16 has on reducing the vehicle's overall vertical clearance. As can be appreciated by those skilled in the art, one problem with many of the prior art lighting systems is that they tend to position the light bar 16, or other light source, too high relative to the support structure on which it is mounted. Besides somewhat unnecessarily increasing the vehicle's clearance requirement, such a configuration often results in a weaker mounting system that, particularly when impacted by forces resulting from off-road use, can cause the light source to become separated from the support structure. The lighting system 10 of the present invention provides a generally smaller spacing that avoids the above-described problems.

The configuration, use and operation of the elongated light bar 16 is generally well known in the art. For instance, in one embodiment, the elongated light bar 16 can be configured as described in the '821 patent (as set forth above, the written description and drawings of the '821 patent are incorporated herein as though fully set forth herein). The elongated light bar 16 has a housing 18 that is structured and arranged to house at least one linear light module 20 so as to discharge light from the light bar 16 through a transparent front surface 22 of the housing 18 located at or near the front side 24 of the light bar 16, as best shown in FIGS. 1 through 4. As shown in these figures, opposite front side 24 of light bar 16 is the back side 26 thereof. As also shown, front surface 22 of housing 18 is generally disposed between the first end 28 and the second end 30 of the light bar 16. Typically, but not exclusively, the transparent front surface 22 of housing 18 extends substantially fully between the first end 28 and second end 30 thereof. The housing 18 has a housing body 32 that defines an enclosed, or at least a closeable chamber in which is received linear light module 20. The light module 20 is mounted inside the chamber of the housing body 32 in a manner that faces the light-producing components thereof generally forward so the light therefrom will be directed out the transparent front surface 22 when in use to illuminate an area forwardly of the light bar 16. Although the housing 18 of light bar 16 can be made as a single integral component, in the embodiment shown in the figures, the housing body 32 is manufactured to be open toward the front side 24, which is then closed by transparent front surface 22. The front surface 22 is supported by a front surface frame 34 against the housing body 32 to close the linear light module 20 inside the chamber defined by the housing 18. In one embodiment, the front surface 22 is incorporated into frame 34. In another embodiment, front surface 22 is compressed between frame 34 and the open housing body 32 at the front side 24 of the light bar 16. In either embodiment, the frame 34 needs to be configured to sealably close against the housing body 32 to prevent moisture from entering into the chamber of the housing 18 and damaging the linear light module 20. If desired, frame 34 can be configured to be removably attached to the housing body 32 using a plurality of connectors, such as screws and the like. As shown in FIGS. 1 through 8, an electric power cord 36 extending outward from the back end 26 of the housing 18 connects to a source of power to energize the electric components of the linear light module 20. Typically, the source of power is one or more batteries in the vehicle associated with the support structure 12.

The linear light module 20 comprises a plurality of light-producing components, shown as 38 in FIGS. 1, 9 and 13, that are selected to produce the desired amount of light from the light bar 16. Although a variety of lamps or other light-producing components 38 can be utilized with the elongated light bar 16 of lighting system 10, the preferred light-producing components are LEDs, the use, benefit and configuration of which are well known in the art. A typical elongated light bar 16 has a plurality of LEDs 38 that are arranged in one or more rows and positioned so as to be facing outwards through the transparent front surface 22 of a housing 18 that is structured and arranged to house the LEDs 38. Although the embodiments shown in the figures have one row of LEDs 38, those skilled in the art will readily appreciate that the LEDs can be disposed in multiple rows in either offsetting or aligned relationship to each other. The linear light module 20 also comprises a focusing lens 40 that is associated with each LED 38 so as to focus the light generated by the LED 38 into a beam of light of a desired pattern, a lens positioner (not specifically shown) that is associated with each focusing lens 40 to position the focusing lens 40 relative to the LED 38 and a composite circuit board 42 having an appropriately configured interface circuitry (not specifically shown) printed thereon that is configured to supply the electrical power from the power supply, through the power cord 36, to the LEDs 38 and to selectively control the operation of the LEDs 38. Typically, the LEDs 38, focusing lenses 40 and lens positioners are mounted directly onto the composite circuit board 42 in a manner that provides the desired light operation and the necessary heat dissipation for efficient use of the linear light module 20. As with LEDs 38, the configuration, use and operation of the focusing lens 40, lens positioner, circuit board 42 and the interface circuitry are generally well known in the art, for example as set forth in the '821 patent (as previously stated, the written description and drawings of the '821 patent are incorporated herein as though fully set forth herein).

To mount the elongated light bar 16 to the support structure 12, the lighting system 10 of the present invention utilizes an end mounting mechanism that comprises a first mounting assembly 44 attached to the first end 28 of the light bar 16 and a second mounting assembly 46 attached to the second end 30 of the light bar 16, as best shown in FIGS. 1-2, 5, 9, 12-13 and 16. Unlike prior art mounting mechanisms, the mounting mechanism of the lighting system 10 of the present invention attaches to the ends 28/30 of the elongated light bar 16 to connect the light bar 16 to the support structure 12 and, as a result, to the vehicle to which support structure 12 is attached to, integral with or otherwise associated. The first mounting assembly 44 is structured and arranged to be securely and pivotally attached to the first end 28 of the light bar 16 and the second mounting assembly 46 is structured and arranged to be securely and pivotally attached to the second end 30 of the light bar 16. The mounting assemblies 44/46 are also securely attached to the mountable surface 14 of the support structure 12, which thereby securely attaches lighting system 10 to support structure 12. The end mounting mechanism, comprising the mounting assemblies 44/46, described herein has been found to securely and pivotally attach the light bar 16 to the support structure 12 so as to allow the user increased flexibility with regard to positioning the lighting assembly 10 on the support structure 16 and provide the required stability for the light bar 16 to function as desired in a manner which is much more economical to manufacture than prior art lighting systems, particularly those that provide auxiliary lighting for a vehicle or the like.

As best shown in FIGS. 1-2, 5, 9, 12-13 and 16, each of the first mounting assembly 44 and the second mounting assembly 46 generally comprise a mounting means 48 for removably mounting the elongated light bar 16 to the mountable surface 14 of the support structure 12, a mounting member 50 that interconnects the mounting means 48 and one of the ends 28/30, as appropriate, of the light bar 16 and an end connector 52 that connects the mounting member 50 to the respective end 28/30 of the light bar 16. The mounting means 48 of the two mounting assemblies 44/46 is configured to engage the mountable surface 14 of support structure 12 in a manner that removably, but securely, attaches the lighting system 10 to the support structure 12. As will be readily understood by persons skilled in the art, the exact configuration of the mounting means 48 for a particular lighting system 10 will depend on the size and shape of the mountable surface 13 of support structure 12.

Figure 3:
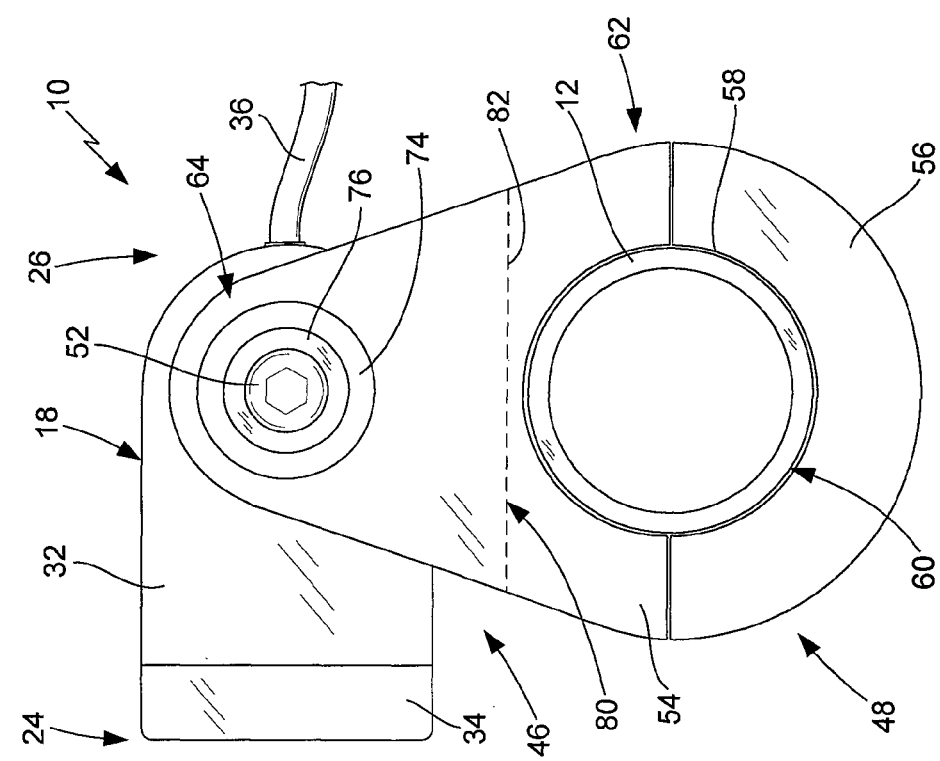
FIG. 3 is an end view of the second end of the lighting system of FIG. 1 shown mounted to the cylindrically-shaped tube of FIG. 1.
Figure 5:
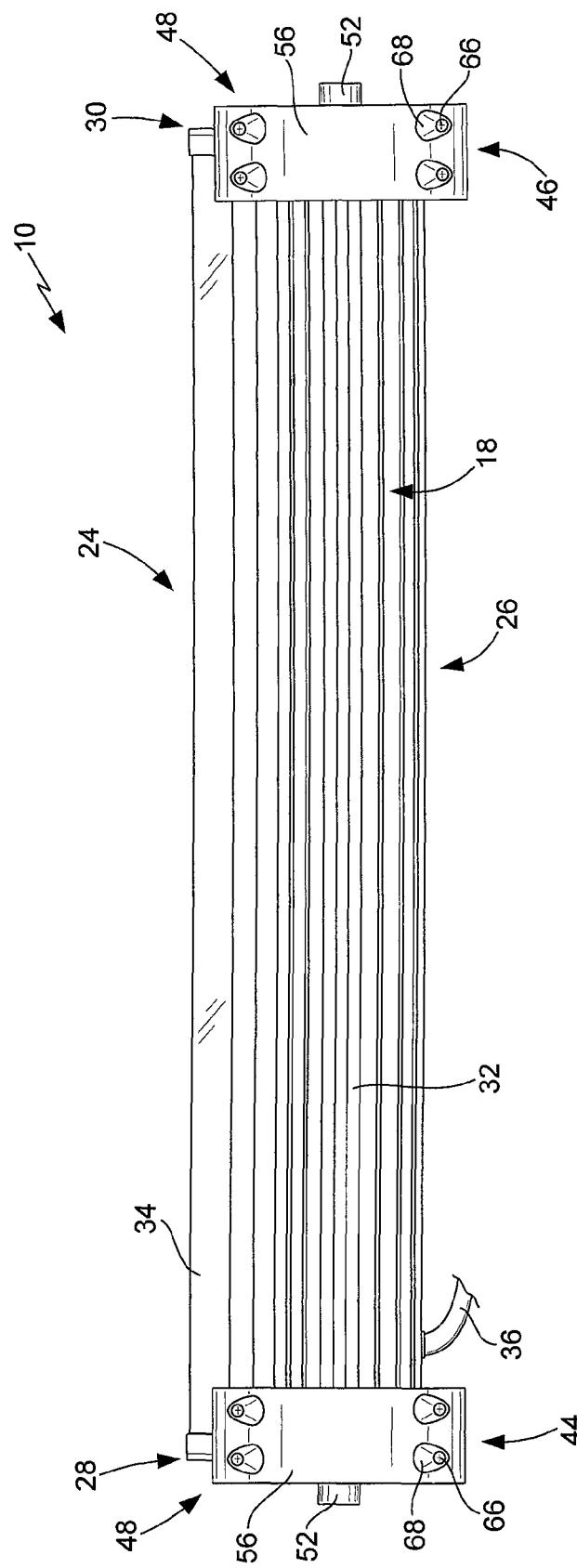
FIG. 5 is a bottom plan view of the lighting system of FIG. 1 particularly illustrating the connectors utilized to connect the lower clamping section to the upper clamping section of each of the mounting assemblies.

In the embodiment of FIGS. 1 through 8, the support structure 12 is a roll bar or the like with a mountable surface 14 that comprises a generally round or circular-shape. As best shown in FIGS. 3 and 4, typically this type of support structure 12 is a round tubular member. However, as well known, this type of support structure 12 can be a solid member and/or have a non-circular shape. For instance, it may be known to use tubular members with a square, rectangular, triangular or hexagon shape, among others, for a roll bar or for a component of a protective cage. As will be appreciated by those skilled in the art, the present invention can be readily adapted to other non-circular shaped cross-sections.

In the embodiment of FIGS. 1 through 8, the mounting means 48 has an upper engaging member 54 and a lower engaging member 56 that are each structured and arranged to be placed in removable engagement with each other and, when in such engagement, define a support aperture 58 that is cooperatively sized and configured with the structure shape 60 of the mountable surface 14 of the support structure 12, as best shown in FIGS. 3-4 and 6-8. In the embodiment shown in these figures, the support structure 12 has a structure shape 60 with a circular cross-section and, as a result, the joined upper engaging member 54 and lower engaging member 56 are cooperatively configured so as to define a circular support aperture 58 that is sized to abuttingly engage the mountable surface 14 of the support structure 12. To provide the best and most complete engagement with the support structure 12, thereby providing the most secure mounting onto support structure 12, the preferred embodiment of this configuration has upper 54 and lower 56 engaging members radially disposed around the support structure 12 so as to fully encircle the mountable surface 14 of the support structure 12 in a manner which provides a full 360 degree clamping engagement onto the support structure 12. As will be readily appreciated by persons skilled in the art, the clamping engagement provided by joining the upper 54 and lower 56 engaging members provides a number of advantages over the prior art lighting systems 10, namely more secure mounting to the support structure 12, ability to mount onto the support structure 12 without having to drill a hole in the support structure 12 and easier to position and, as necessary, reposition the lighting system 10 on support structure 12.

As shown in FIGS. 3-4 and 6-8, the upper engaging member 54 of this embodiment is integrally formed at the lower end 62 of mounting member 50 (with the upper end 64 thereof being attached to light bar 16) and cooperatively structured and arranged with the lower engaging member 56 such that areas thereof are placed in abutting relationship. In alternative embodiments, the upper engaging member 54 can be a separate component that is attached to the lower end 62 of the mounting member 50. The lower engaging member 56 removably attaches to the opposing surface of the upper engaging member 54. To remove the lighting system 10 from the support structure 12, the lower engaging member 56 is completely separated from the upper engaging member 54. To move the lighting system 10 relative to the support structure 12, the abutting engagement of lower engaging member 56 to the upper engaging member 54 merely has to be loosened an amount sufficient to allow the lighting system 10 to slide along the mountable surface 14 of support structure 12. To accomplish the separation or loosening, the two engaging members 54/56 have to be configured to removably attach using a connecting means such as the connecting elements 66, which may be screws, bolts or the like, such as those shown in FIGS. 5 and 7-8, that are received in cooperatively sized and configured holes (not shown) in the upper engaging member 54. In the embodiment shown, a cutout 68 is provided to receive, guide and protect the connecting elements 66.

As set forth above, the structure shape 60 of the mountable surface 14 of the support structure 12 can be circular (as shown in the figures), square, rectangular, triangular or a variety of different shapes. The upper 54 and lower 56 engaging members should be configured to have a support aperture 58 that is cooperatively sized and configured to place the mounting means 48 in abutting relation with the mountable surface 14 so the user may tightly clamp the upper 54 and lower 56 engaging members against the support structure 12 using one or more connecting elements 66. As will be readily appreciated by persons skilled in the art, the upper 54 and lower 56 engaging members can be made out of a variety of materials that, in one embodiment, are selected so as to be able to mold, form, cut or otherwise be able to provide the necessary support aperture 58 that corresponds to the structure shape 60 to accomplish the desired clamping of the mounting means 48 to the support structure 12.

Figure 8:
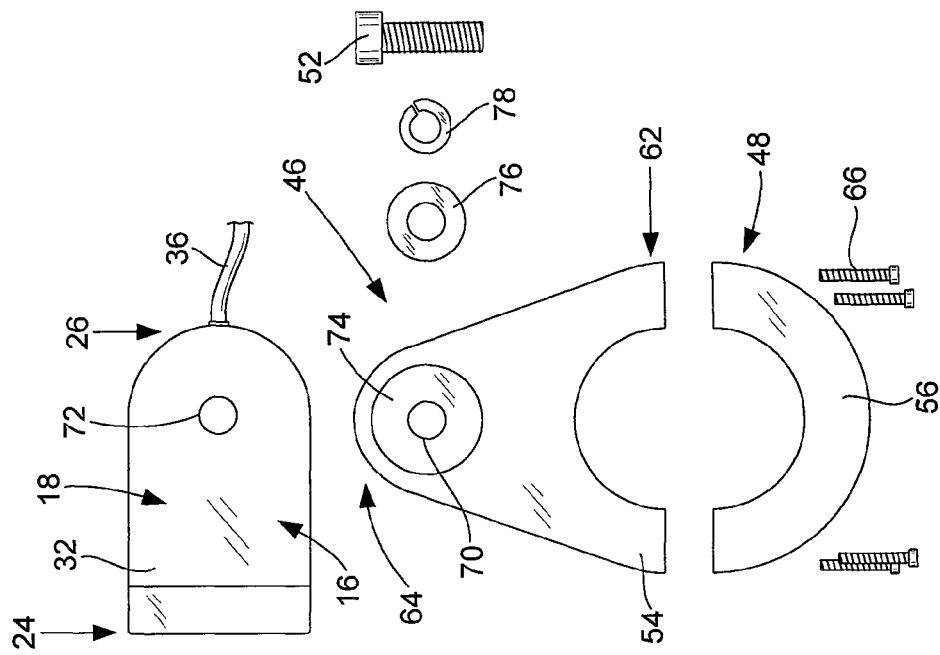
FIG. 8 is an exploded end view of the second end of the lighting system of FIG. 7 showing the second mounting assembly separated from the second end of the elongated light bar.
Figure 7:
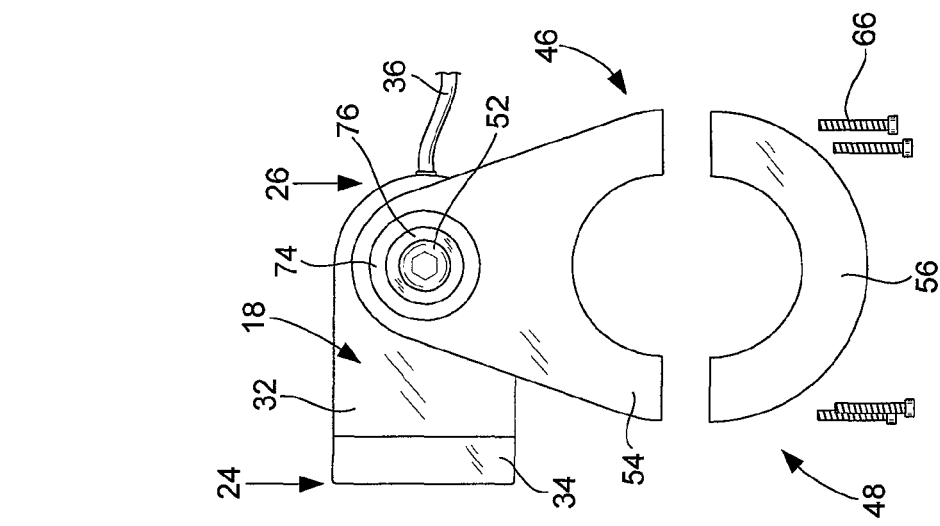
FIG. 7 is a partially exploded end view of the second end of the lighting system of FIG. 6 with the lower clamping section of the second mounting assembly shown separated from the upper clamping section thereof.
Figure 6:
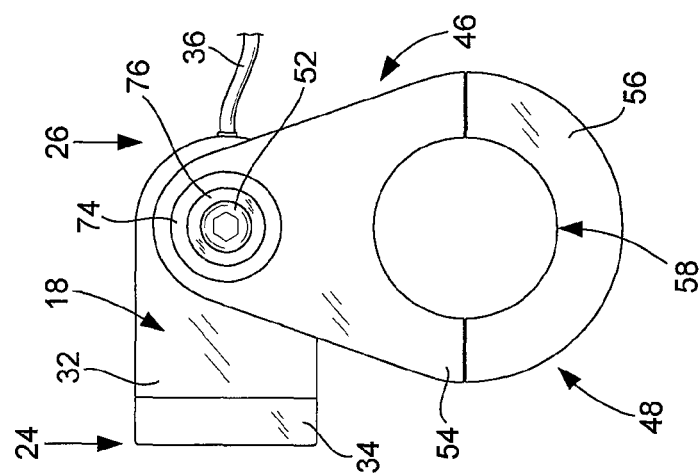
FIG. 6 is an end view of the second end of the lighting system of FIG. 3 shown without the tube to better illustrate the components of the second mounting assembly.

The upper end 64 of mounting member 50 is configured to facilitate the desired pivotal connection between the respective end 28/30 of the elongated light bar 16 and the mounting member 50. As best shown in FIGS. 3-4 and 6-8, in one embodiment a hole 70, sized and configured to receive a threaded portion of the end connector 52, is provided near the upper end 64 of mounting member 50 through which the end connector 52 is extended into a threaded aperture 72 in the housing 18 of the light bar 16. In a preferred embodiment, the hole 70 in the mounting member 50 is threaded so as to threadably receive the end connector 52 therein. Alternatively, the hole 70 in mounting member 50 may be unthreaded so as to just allow end connector 52 to pass therethrough. In the configuration shown in the figures, mounting member 50 has a recessed area 74 near the upper end 64 around the hole 70. Recessed area 74 is sized and configured to position the head of the end connector 52 below the surface of mounting member 50 to reduce the likelihood that the end connector 52 will be damaged during use of the lighting system 10. Utilized with the end connector 52 is a washer 76 and a lock washer 78, as best shown in FIG. 8. As with end connector 52, the washer 76 and lock washer 78 are both received in the recessed area 74 of the mounting member 50 below the surface of the mounting member 50. As stated above, the various components associated with connecting the mounting means 48, which in the embodiment shown is more specifically upper engaging member 54, to the housing 18 of the elongated light bar 16 are selected so as to provide the desired pivotal relationship therebetween. As such, the user is able to tilt the front side 24 of light bar 16 relative to the mounting means 48 (as shown in the transition from FIG. 3 to FIG. 4), and as a result the support structure 12, so as to direct the light produced from the linear light module 20 to the area where he or she desires to benefit from the area being lit. As set forth above, the light from the linear light module 20 preferably passes through a protective transparent front surface 22, which may be made out of glass, plastic or the like.

In the preferred embodiment of the present invention, the lighting system 10 also includes a pivot limiting means 80 that is configured to limit the amount of pivotal motion of the elongated light bar 16 relative to the mounting means 48 and the support structure 12. In the embodiment shown in FIGS. 1 through 8, the limiting means 80 is a ledge or shelf-like structure 82 attached to or, preferably, integral with the inner wall of the mounting member 50, as best shown in FIGS. 1, 3 and 4. As can be readily appreciated by those skilled in the art, as the light bar 16 is pivoted forward the amount of tilting is limited by the housing 18 of the light bar 16 contacting the ledge structure 82, as shown in FIG. 4, thereby protecting the lighting system 10 from excessive forward tilting of light bar 16. Preferably, the ledge structure 82 is positioned such that the back side 26 of the light bar 16 is allowed to move over the ledge structure 82 so the front side 24 of the light bar 16 can be pivoted rearward to direct the light from the linear light module 20, as desired by the user, generally upward or rearward relative to mounting means 48 and support structure 12.

In the embodiment of FIGS. 9 through 16, the support structure 12 is one or more planar or at least substantially planar mountable surfaces 14. In the embodiment shown in FIGS. 9 through 12, the lighting system 10 is removably attached to a pair of planar mountable surfaces 14. In the embodiment shown of FIGS. 13 through 16, the lighting system 10 is removably attached to a single planar mountable surface 14. Although the elongated light bar 16 shown in these figures has a shorter length, with a correspondingly fewer number of LEDs, than in the embodiment set forth above, the configuration and operation of elongated light bar 16 is as described above. In this embodiment, the mounting means 48 is configured to removably engage the planar mountable surface(s) 14 so as to removably mount the elongated light bar 16 thereto. Instead of circumferentially clamping onto a tubular-shaped mountable surface 14 as set forth in the previous embodiment (as best shown in FIGS. 1 through 4), the mounting means 48 of the embodiment of FIGS. 9 through 16 is configured to be placed in generally planar abutting relation with the mountable surface 14 of the support structure 12. To accomplish this, the mounting means 48 comprises a substantially attaching member 84 having a downward facing (in the embodiment shown) generally planar attaching surface 86 that is sized and configured to be placed in abutting relation with the upwardly (in the embodiment shown) facing mountable surface 14 of the support structure to which the lighting system 10 will mount. As will be readily appreciated by those skilled in the art, the use of the terms upwardly and downwardly herein are in reference to the drawings that show various exemplary embodiments of the present invention and is not intended to limit in any way the configuration and/or use of the present invention. The lighting system 10 may be mounted on a mountable surface 14 facing in any direction with the attaching surface 86 thereof being appropriately directed.

Figure 11:
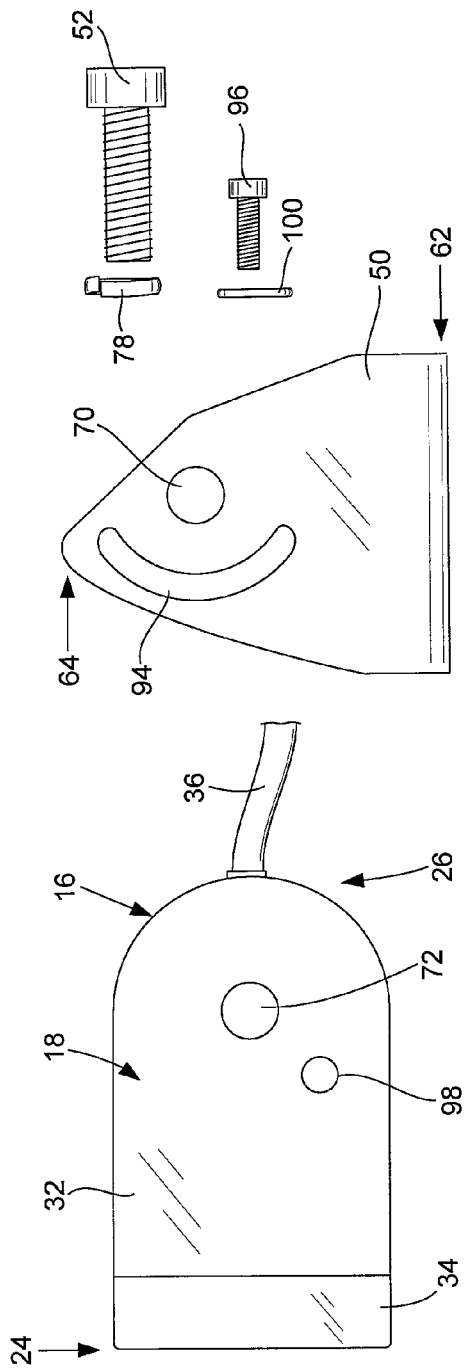
FIG. 11 is an exploded view of the second end of the lighting system of FIG. 9 showing the second mounting assembly separated from the second end of the elongated light bar.
Figure 12:
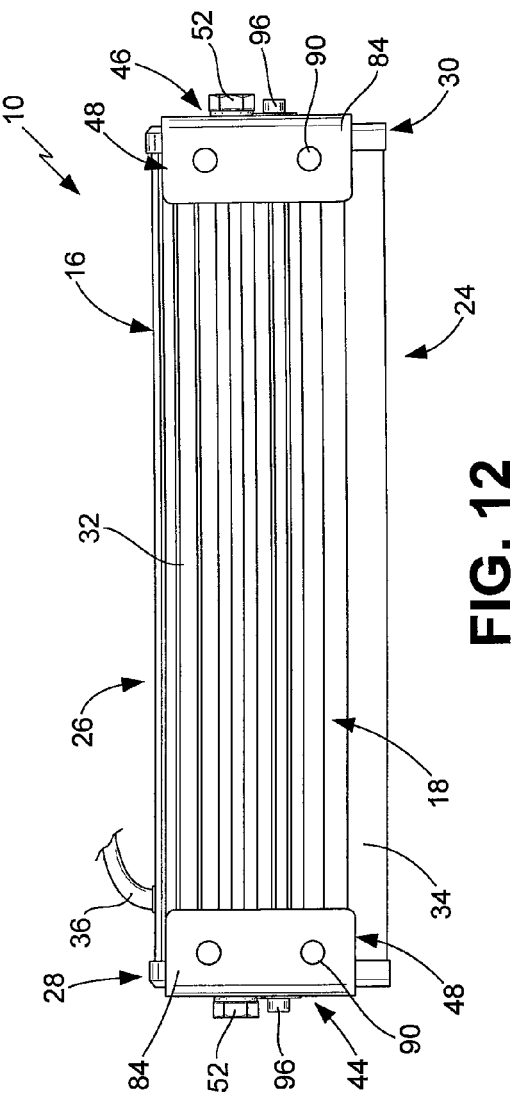
FIG. 12 is a bottom plan view of the lighting system of FIG. 9 shown without the connectors used to connect the mounting assemblies to the generally planar surface.

As with the previously described embodiment, the lighting system 10 mounts the elongated light bar 16 to the planar mountable surface 14 utilizing the first mounting assembly 44 at the first end 28 of the light bar 16 and a second mounting assembly 46 at the second end 30 of the light bar 16. As described above, each mounting assembly 44/46 comprises a mounting member 50 that is, preferably, removably and pivotally connected to the respective ends 28/30 of the light bar 16 using one or more appropriately sized and configured end connectors 52 that are received, threadably in the figures, through the hole 70 near the upper end 64 of the mounting member 50 and the aperture 72 in the housing 18 of light bar 16, as best shown in FIG. 11. In one configuration, the attaching members 84 of the mounting means 48 of mounting assemblies 44/46 are attached to the mountable surface 14 of support structure 12 using one or more connecting elements 88 that are received through one or more appropriately sized and positioned apertures 90 (shown in FIG. 12) in the attaching member 84 and then secured together by using a securing element 90. In the embodiment shown in FIGS. 9 through 16, the connecting element 88 is a bolt and the securing element 90 is a nut. As will be readily appreciated by those skilled in the art, a variety of other connecting elements 88 and, as may be appropriate, securing elements 90 may be utilized to secure the attaching member 84 to the mountable surface 14. For instance, the connecting element 88 can be a screw, thereby eliminating the need for the securing element 90. In addition, the attaching member 84 can be removably attached using various other connecting mechanisms as may be appropriate for the mountable surface 14 and the use of the lighting system 10 or it may be fixedly attached to the mountable surface 14 by welding, adhesives, rivets and the like.

As with the above-described embodiment, the lighting system 10 of the embodiments shown in FIGS. 9 through 16 includes a pivot limiting means 80 that is structured and arranged to limit the amount which the elongated light bar 16 can pivot relative to the two mounting assemblies 44/46. In this embodiment, the pivot limiting means 80 comprises a slot 94 in each of the mounting members 50 that is sized and configured to receive a pivot limiter 96 that is attached to each end 28/30 of the light bar. In the embodiment shown, the pivot limiter 96 is a threaded bolt that is received in the limiter aperture 98 in the housing 18 at the ends 28/30 of the light bar 16. If desired, one or more washers 100, best shown in FIG. 11, may also be utilized with this pivot limiting means 80. As will be readily appreciated by persons who are skilled in the art, slot 94 and pivot limiter 96 are cooperatively structured and arranged such that, when pivoting is allowed by the user, the light bar 16 can pivot an amount reflected between the ends of the slot 94, which are contacted by pivot limiter 96 to prevent further pivotal rotation of the light bar 16. Pivoting of the light bar 16 can be achieved by loosening the pivot limiter 96 (e.g., by unthreading, unscrewing or the like) to allow the light bar 16 to pivot relative to the first 44 and second 46 mounting assemblies. Once the user has the desired angle of the light bar 16, he or she merely has to thread, screw or otherwise tightly secure the pivot limiter 96 against the mounting member 50 to lock the light bar 16 in place and prevent any unintended pivoting. Various other types of pivot limiting means 80 can be utilized with this embodiment of the lighting system 10.

The embodiment shown in FIGS. 13 through 16 illustrates the use of multiple elongated light bars 16 with lighting system 10. In this embodiment, one light bar 16a is mounted below a second, similarly configured light bar 16b to provide a different lighting effect, as may be desired by some users for some types of uses. Each of the light bars 16a/16b, which are configured as described above for the previous embodiments, are pivotally connected to the mounting member 50 of the first mounting assembly 44 and the second mounting assembly 46, as best shown in FIGS. 13 and 14. To accommodate the two light bars 16a/16b, the height of the mounting member 50 is increased, with the light bar 16a positioned towards the lower end 62 of the mounting member 50 and the light bar 16b positioned towards the upper end 64 of the mounting member 50. In the embodiment of the lighting system 10 shown in FIGS. 13 through 16, the two light bars 16a/16b are positioned so the transparent front surface 22 are facing the same direction such that the light from the linear light module 20 will be directed in the same general direction. Due to the separately operated pivot limiting means 80, however, the light bars 16a/16b may be pivoted independent of each other to achieve the user's desired lighting needs. Typically, however, the light bars 16a/16b will be pivoted in substantially the same direction but be operated (e.g., on and off and brightness levels) independently to provide more or less lighting as may be appropriate under the particular circumstances.

In use, the desired size and configuration of the elongated light bar 16 is chosen to accomplish the lighting objectives that are desired for the lighting system 10. The first 44 and second 46 mounting assemblies are selected with a mounting means 48 that is structured and arranged to securely attach the light bar 16 to the mountable surface 14 of the support structure 12 from which the user desires light to be directed. For non-planar mountable surfaces 14, such as the tubular-shaped support structure 12 shown in the embodiment of FIGS. 1 through 9, a mounting means 48 is preferably selected with a support aperture 58 that is cooperatively sized and configured relative to the structure shape 60 of the mountable surface 14 so the mounting means 48 may at least substantially fully encircle the mountable surface 14 so mounting means 48 may be clamped onto the support structure 12. For planar mountable surfaces 14, a mounting means 48 having an attaching member 84 with a generally planar attaching surface 86 will be selected so that the attaching member 84 can be placed in abutting relation with the mounting surface 14. Typically, the two mounting assemblies 44/46 are attached to the mountable surface 14 prior to the ends 28/30 of the light bar 16 being attached to the mounting assemblies 44/46. For the non-planar configuration, typically the upper engaging member 54 is placed against the mountable surface 14 and then the lower engaging member 56 is attached to the upper engaging member 54 to secure the mounting means 48 of the two mounting assemblies 44/46 to the support structure 12, as best shown in FIG. 1. For the planar configuration, the attaching surface 86 of the attaching member 84 is typically placed against the planar mountable surface 14 such that the apertures 90 in the attaching member 84 are aligned with holes (not shown) in the support structure 12 and then the appropriate connecting elements 88 and securing elements 92 are utilized to clamp the two components together, as best shown in FIGS. 9 and 13. Once the two mounting assemblies 44/46 are securely attached to the mountable surface 14 of the support structure 12, the elongated light bar 16 or light bars 16a/16b are attached to the mounting assemblies 44/46 using the end connectors 52. The user then can pivot the light bar 16 relative to the mounting assemblies 44/46 to achieve the desired lighting effect. Electrical power delivered to the light bar 16, typically as selectively controlled by the user utilizing appropriate switching devices and the like, through the power cord 36 energizes the linear light module 20 to light the LEDs.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A lighting system, comprising:
   at least one elongated light bar having a first end and a second end, said light bar comprising a housing structured and arranged to house at least one linear light module so as to discharge light from said light module through a transparent surface of said housing, said at least one light module configured to produce said light, said transparent surface of said housing generally disposed between said first end and said second end of said light bar along a side of said light bar;
   a first mounting assembly pivotally attached to said first end of said light bar; and
   a second mounting assembly pivotally attached to said second end of said light bar,
   wherein each of said first mounting assembly and said second mounting assembly comprise a means for removably mounting said light bar to a mountable surface of a support structure and a mounting member interconnecting said mounting means and said light bar, said mounting member having have a first end adjacent said housing of said light bar and a second end attached to or integral with said mounting means.

2. The lighting system of claim 1, wherein said first end of said mounting member of said first mounting assembly is in abutting relation with said first end of said light bar and said first end of said mounting member of said second mounting assembly is in abutting relation with said second end of said light bar.

3. The lighting system of claim 1, wherein each of said mounting member of said first mounting assembly and said mounting member of said second mounting assembly are structured and arranged to dispose said light bar in spaced apart relation to said mountable surface.

4. The lighting system of claim 1 further comprising a means associated with at least one of said first mounting assembly and said second mounting assembly for limiting the pivotal movement of said light bar relative to said support structure.

5. The lighting system of claim 4, wherein said limiting means comprises an inwardly disposed ledge structure attached to or integral with said mounting member of said first mounting assembly and an inwardly disposed ledge structure attached to or integral with said mounting member of said second mounting assembly, each of said ledge structures being sized and configured to abut said housing of said light bar when limiting the pivotal movement of said light bar.

6. The lighting system of claim 4, wherein said limiting means comprises a slot in said mounting member of said first mounting assembly, a pivot limiter at said first end of said light bar, a slot in said mounting member of said second mounting assembly and a pivot limiter at said second end of said light bar, each of said slots being sized and configured to receive, respectively, said pivot limiter and to abut said pivot limiter when limiting the pivotal movement of said light bar.

7. The lighting system of claim 1, wherein said mounting means of each of said first mounting assembly and said second mounting assembly are configured so as to removably secure said light bar to said mountable surface.

8. The lighting system of claim 7, wherein said mounting means of each of said first mounting assembly and said second mounting assembly has a first engaging member, a second engaging member and one or more connecting elements, said one or more connecting elements selected so as to attach said first engaging member and said second engaging member together and onto said mountable surface of said support structure.

9. The lighting system of claim 8, wherein said first engaging member and said second engaging member are cooperatively configured to clamp each of said first mounting assembly and said second mounting assembly onto said mountable surface.

10. The lighting system of claim 9, wherein said first engaging member and said second engaging member jointly define a support aperture that is correspondingly sized and configured with a structure shape of said mountable surface so as to abuttingly engage said mountable surface of said support structure by at least substantially fully encircling said mountable surface thereof so as to provide a full 360 degree clamping engagement therewith.

11. The lighting system of claim 7, wherein said mountable surface is at least substantially planar and said mounting means of each of said first mounting assembly and said second mounting assembly comprise an attaching member having an attaching surface that is cooperatively configured with said mountable surface so said attaching member may be placed in abutting relationship with said mountable surface.

12. The lighting system of claim 11, wherein said mounting means further comprise one or more connecting elements selected so as to removably attach said attaching member to said mountable surface.

13. A lighting system, comprising:
at least one elongated light bar having a first end and a second end, said light bar comprising a housing structured and arranged to house at least one linear light module so as to discharge light from said light module through a transparent surface of said housing, said at least one light module configured to produce said light, said transparent surface of said housing generally disposed between said first end and said second end of said light bar along a side of said light bar;
a first mounting assembly having a mounting member with a first end pivotally attached to said first end of said light bar and a second end attached to or integral with a means for mounting said first mounting assembly to a mountable surface of a support structure;
a second mounting assembly having a mounting member with a first end pivotally attached to said second end of said light bar and a second end attached to or integral with a means for mounting said second mounting assembly to a mountable surface of said support structure, wherein said mounting means of each of said first mounting assembly and said second mounting assembly are structured and arranged to removably secure said light bar to said support structure; and
means associated with at least one of said first mounting assembly and said second mounting assembly for limiting the pivotal movement of said light bar relative to said support structure.

14. The lighting system of claim 13, wherein said limiting means comprises an inwardly disposed ledge structure attached to or integral with said mounting member of said first mounting assembly and an inwardly disposed ledge structure attached to or integral with said mounting member of said second mounting assembly, each of said ledge structures being sized and configured to abut said housing of said light bar when limiting the pivotal movement of said light bar.

15. The lighting system of claim 13, wherein said limiting means comprises a slot in said mounting member of said first mounting assembly, a pivot limiter at said first end of said light bar, a slot in said mounting member of said second mounting assembly and a pivot limiter at said second end of said light bar, each of said slots being sized and configured to receive, respectively, said pivot limiter and to abut said pivot limiter when limiting the pivotal movement of said light bar.

16. The lighting system of claim 13, wherein said mounting means of each of said first mounting assembly and said second mounting assembly has a first engaging member, a second engaging member and one or more connecting elements, said first engaging member and said second engaging member cooperatively configured to clamp each of said first mounting assembly and said second mounting assembly onto said mountable surface, said one or more connecting elements selected so as to attach said first engaging member and said second engaging member together and onto said mountable surface of said support structure.

17. The lighting system of claim 16, wherein said first engaging member and said second engaging member jointly define a support aperture that is correspondingly sized and configured with a structure shape of said mountable surface so as to abuttingly engage said mountable surface of said support structure by at least substantially fully encircling said mountable surface thereof so as to provide a full 360 degree clamping engagement therewith.

18. The lighting system of claim 13, wherein said mountable surface is at least substantially planar and said mounting means of each of said first mounting assembly and said second mounting assembly comprise an attaching member having an attaching surface that is cooperatively configured with said mountable surface so said attaching member may be placed in abutting relationship with said mountable surface and one or more connecting elements selected so as to removably attach said attaching member to said mountable surface.

19. A lighting system, comprising:
at least one elongated light bar having a first end and a second end, said light bar comprising a housing structured and arranged to house at least one linear light module so as to discharge light from said light module through a transparent surface of said housing, said at least one light module configured to produce said light;
a first mounting assembly having a mounting member with a first end pivotally attached to said first end of said light bar and a second end attached to or integral with a means for mounting said first mounting assembly to a mountable surface of a support structure;
a second mounting assembly having a mounting member with a first end pivotally attached to said second end of said light bar and a second end attached to or integral with a means for mounting said second mounting assembly to a mountable surface of said support structure, wherein said mounting means of each of said first mounting assembly and said second mounting assembly are structured and arranged to removably secure said light bar to said support structure; and
means at each of said first end and said second end of said light bar and associated with each of said first mounting assembly and said second mounting assembly for limiting the pivotal movement of said light bar relative to said support structure.

20. The lighting system of claim 19, wherein said mounting means of each of said first mounting assembly and said second mounting assembly has a first engaging member, a second engaging member and one or more connecting elements, said first engaging member and said second engaging member jointly defining a support aperture that is correspondingly sized and configured with a structure shape of said mountable surface so as to abuttingly engage said mountable surface of said support structure by at least substantially fully encircling said mountable surface thereof so as to provide a full 360 degree clamping engagement therewith, said one or more connecting elements selected so as to attach said first engaging member and said second engaging member together and onto said mountable surface of said support structure.

\* \* \* \* \*